US012692038B2

(12) United States Patent
Acciari et al.

(10) Patent No.: US 12,692,038 B2
(45) Date of Patent: Jul. 28, 2026

(54) PLANT AND METHOD FOR LABELING REELS OF WEB MATERIAL

(71) Applicant: A.CELLI NONWOVENS S.p.A., Porcari (IT)

(72) Inventors: Giuseppe Acciari, Porcari (IT); Simone Bertuccelli, Porcari (IT)

(73) Assignee: A.CELLI NONWOVENS S.P.A., Porcari (IT)

(*) Notice: Subject to any disclaimer, the term of this patent is extended or adjusted under 35 U.S.C. 154(b) by 134 days.

(21) Appl. No.: 18/845,481

(22) PCT Filed: Mar. 10, 2023

(86) PCT No.: PCT/EP2023/056168
§ 371 (c)(1),
(2) Date: Sep. 10, 2024

(87) PCT Pub. No.: WO2023/170269
PCT Pub. Date: Sep. 14, 2023

(65) Prior Publication Data

US 2025/0187776 A1 Jun. 12, 2025

(30) Foreign Application Priority Data

Mar. 11, 2022 (IT) ........................ 102022000004733

(51) Int. Cl.

| | |
|---|---|
| ***B65C 9/18*** | (2006.01) |
| ***B65C 9/26*** | (2006.01) |
| ***B65H 19/12*** | (2006.01) |

(52) U.S. Cl.
CPC .............. *B65C 9/1892* (2013.01); *B65C 9/26* (2013.01); *B65H 19/12* (2013.01); *B65H 2301/5163* (2013.01); *B65H 2701/192* (2013.01); *B65H 2801/75* (2013.01)

(58) Field of Classification Search
CPC ......... B65C 9/1892; B65C 9/26; B65H 19/12; B65H 2301/5163; B65H 2801/75
See application file for complete search history.

(56) References Cited

U.S. PATENT DOCUMENTS

| | | | |
|---|---|---|---|
| 2010/0025516 | A1 | 2/2010 | Barsacchi |
| 2021/0354945 | A1 | 11/2021 | Deng et al. |

FOREIGN PATENT DOCUMENTS

| | | | | |
|---|---|---|---|---|
| EP | 3808688 | A1 * | 4/2021 | ............. B65H 19/30 |
| JP | 2002308241 | A | 10/2002 | |
| JP | 2009543704 | A | 12/2009 | |
| JP | 2010222042 | A | 10/2010 | |
| WO | 2008/010239 | A1 | 1/2008 | |
| WO | 2021/074207 | A1 | 4/2021 | |

* cited by examiner

*Primary Examiner* — Daniel Mcnally
(74) *Attorney, Agent, or Firm* — McGlew and Tuttle, P.C.

(57) ABSTRACT

The plant includes at least one support (3) for the reels (B1, B2 . . . . Bn) to be labeled, a label dispenser, a first labeling robot (11) adapted to take labels from the label dispenser and to insert them into the central openings of the reels arranged on the support, and a second handling robot (31) adapted to take the reels and to move them away from the support (3).

23 Claims, 20 Drawing Sheets

PLANT AND METHOD FOR LABELING REELS OF WEB MATERIAL

TECHNICAL FIELD

The present invention relates to a system for handling and labeling reels of web materials, for example (even not exclusively) non-wovens and paper.

BACKGROUND OF THE INVENTION

Usually, the reels of web material are wound around tubular elements made of various materials or are formed by leaving, in the central part of the reel, a cylindrical open space, coaxial with the reel. The cylindrical space is necessary for the subsequent processing steps. Therefore, generally speaking, the reels have a central opening, around which the web material is wound. The central opening is substantially coaxial with the approximately cylindrical side surface of the reel, and extends along the reel axis, orthogonally to the approximately flat end surfaces of the reel.

To identify and track a reel of web material coming from a production line or a processing line, colored labels are usually used as well as labels with identification codes, for example machine-readable codes, such as bar codes, QR codes, numbers, customized codes, alphanumeric OCR characters, and the like. In some cases, the labels include an RFID tag. The labels, even when provided with an RFID tag, usually are sheet-shaped thin elements having an adhesive surface, that are attached in various points of the reels, both to the outer surface and to the inside the central hole or opening.

After having been identified, the reels are generally selected and sorted into groups to form stacks that are subsequently packaged and palletized.

One of the known methods for selecting, sorting and labeling the reels is the use of a robot, which takes the reels of web material one by one from a table where the reels are arranged adjacent to one another with their axes horizontal or approximately horizontal. In other words, the side cylindrical surfaces of the reels rest on a rest surface, while the flat end surfaces of the reels are free and accessible by a handling robot, or placed next to adjacent reels.

The first reel of a row of reels, that are adjacent to, and coaxially with, one another, is taken by a special gripping device mounted on the robot, and is turned until the axis thereof is arranged vertically. Once turned into vertical position, the reel is placed on a roller conveyor, which transports it to a labeling station, where a labeling device applies labels both to the outer surface of the reel and to the inside of the central hole or opening. This operation is carried out by means of two labeling machines, one for applying the labels to the outside of the reel and one for applying the labels to the inside of the reel.

Then, a further robot takes the labeled reels and arrange them over one another, with the axis in vertical position, to form a stack of reels ready to be packaged or palletized.

A further known method for handling the reels provides that the first robot takes the reels, two by two, from the table where they are arranged with their axes in horizontal position, turns them until the axes are in vertical position, and place them on a roller conveyor. The roller conveyor transports the reels to the labeling station, where they are labeled on both the inner and outer surface. In this case, four labeling machines are provided, two for labeling the outer surface and two for labeling the inner surface of the reel.

WO-A-2021/074207 discloses a method and a plant where a single robot, provided with a labeling and handling device, applies the labels inside the central opening of the reels and handles them by transferring them from a table, where they rest with their axes in horizontal position, to a roller conveyor or other transport member. The drawback of this known system is not to allow high speeds in labeling and handling the reels.

JP2010222042 discloses a method for applying labels inside the opening of the reels. In detail, a roller is provided, on which a label, to be applied to the inner surface of a tubular winding core, is held, as well as a system is provided for keeping the roller contacting the surface of the tubular element so as to generate a pressure sufficient to stick the label.

The known systems for labeling and handling the reels have some drawbacks, in particular low flexibility and/or low handling speed, which negatively affects the productivity of the reel packaging line.

SUMMARY OF THE INVENTION

In order to solve, at least partially, one or more of the drawbacks of the prior art, a plant is provided for labeling and handling reels of web material, the reels having a central opening, around which the web material is wound, wherein the plant comprises at least one support for the reels to be labeled, and to the plant the following are associated: a label dispenser; a first labeling robot adapted to take labels from the label dispenser and to insert them into the central openings of the reels arranged on the support; and a second handling robot adapted to take the reels and to move them away from the support.

As it will become clearly apparent from the detailed description below, the plant allows to carry out labeling and handling operations more quickly than the prior art plants, and to solve, at least partially, some of the drawbacks of the known plants.

According to a further aspect, a method is provided for labeling and handling reels of wound web material, the reels having a central opening and an outer side surface, the method comprising the following steps: arranging a plurality of reels on a reel support; by means of a first robot, applying a label in the central opening of each reel; by means of a second robot, taking each labeled reel from the support and moving it.

Further features and embodiments of the plant and the method of the present invention are described below with reference to the attached drawing, and are defined in the attached claims.

In particular, in the illustrated embodiments, the method for handling and labeling reels of web material provides for the use of a first industrial robot, preferably a robot with an anthropomorphic arm, equipped with a device for picking one or more labels up from a printing machine or a label dispensing machine, and for applying the labels to the inner surface of the tubular winding cores, or in general in the central opening of the reels around which the web material is wound. The labels are applied to one or more reels based on the labeling recipes.

In the present document, the term "label" means a generic support adapted to be fixed to a surface of the reel and containing information in any form, for example printed information or digitally stored information.

A second industrial robot, hereinafter referred to as handling robot, preferably provided with an anthropomorphic arm equipped with a device for gripping and handling the reels, is used to pick up one or more (already labeled) reels at the same time, which are arranged on a table with their axes oriented horizontally, or that in any case rest on the table with their respective cylindrical side surfaces, and to stack them with their axes in vertical position so as to subsequently move them to the packaging and palletizing stations.

In some embodiments, the method also provides for the application of labels to the outer surface of one or more reels, the application being carried out within the same time in which the first robot, also called labeling robot, applies the labels to the inside of the reels. The labels can be applied by means of a printing and applying system, for example mounted on a slide moving parallel to the axis of the reels resting on the table, or on other reel support, with a horizontal or approximately horizontal axis.

The use of two robots, one for labeling and one for handling the reels, allows to reduce the handling time compared to the already known solutions because:

- it allows to label and to handle more than one reel at the same time;
- it allows to reduce the overall labeling and handling time: while the handling robot moves the reels, the labeling robot takes the labels and applies them inside the subsequent reels.

To speed up the operation cycle and to make the system reliable regardless of the material of the reels, that can be more or less soft, in embodiments described herein a system is provided, associated with the first robot, for searching the center of the reels. This centering system eases the step of inserting inside the reels the members of the first robot that apply the labels. A centering system can be associated with the second robot, to facilitate the insertion of gripping and handling devices into the central opening of the reels.

It is also possible to have a single centering system for both robots, and can be arranged for example on board the labeling robot.

One and/or the other of the two centering systems can include, one independently of the other: vision systems, scanners, sensors, electromechanical devices, and more. The centering systems allow the robots to move faster and more accurately, thus reducing the time required for handling and labeling the reels.

The labels can be applied inside the reels in any angular position around the axis of the reels.

The labels can be applied using adhesives. Generally, the labels picked up by the labeling robot have an adhesive surface, opposite to that which comes into contact with the label gripping device or member provided on the labeling robot. The robot takes the label from the dispensing machine through a vacuum system, i.e. a suction system, or other systems, for example based on the use of electrostatic charges, mechanical grippers, or other, configured in the form of label-gripping members.

Through the gripping members, the first labeling robot moves the labels inside the central hole or opening of the reel. Then, through a system using a pressurized gas (air, inert gases), the label is pushed against the inner surface of the central opening and, thanks to the adhesive provided on the surface thereof, is attached thereto. From a conceptual viewpoint, elements such as spring applicators, pneumatic applicators or electrostatic charge applicators can also be used for applying the labels. Furthermore, instead of being previously applied to the label, the adhesive can be even applied by the labeling robot directly to the inner surface of the central opening of the reel, before applying the label thereto.

The system has been developed so as to use any method for taking the labels from the dispensing machines and applying them inside the cylindrical opening of the reels In some embodiments, the first robot, or labeling robot, can comprise a device consisting of one rod-like element or a plurality of rod-like elements, on which multiple gripping elements are applied, adapted to pick one or more labels up from the dispensing system and to apply them inside one or more reels. The elements for gripping the labels can be made of various materials and can have different shapes according to the shape of the labels. If the labels are pneumatically handled, the gripping elements can be connected, through a series of pipes, to a pressure controlling system: generation of vacuum, i.e. suction, during the gripping and handling step; and generation of pressurized gas flow, i.e. generation of a gas blow, for applying the labels. Furthermore, the gripping elements can be arranged on elastic flexible elements to allow the labels to uniformly adhere to the inner surface of the central openings of the reels.

The second robot, or handling robot, can consist of an industrial robot, preferably with an anthropomorphic arm, equipped with a specific device or member for gripping and handling the reels that is applied to the head of the robot and is provided with an expandable element, divided into two or more parts adapted to move relative to each other in radial direction by means of actuators, for example pneumatic, hydraulic, mechanical or electric actuators. The movement of the two parts of the expandable element away from each other allows the reel to be gripped from the central opening, in which the expandable element is inserted.

The outer surface of the expandable element can be significantly rough, or can have protruding tip elements, can be coated with materials with high coefficient of friction (rubber, plastics, cork, etc.), or can have a combination of these features. In general, the outer surface of the expandable member is configured to provide an axial retaining force between the expandable gripping element and the inner surface of the central opening of the reel. This allows to lift, move and turn the reels, bringing them from the pickup support (where the reels rest with their axes horizontal or approximately horizontal) to support surfaces, conveyors or roller conveyors where stacks of reels with the axis oriented vertically are formed.

The device or member, with which the second robot is provided, for gripping and handling the reels, can be configured to pick up and handle either a single reel or several reels adjacent to one another. In general, the number of reels that can be handled simultaneously can also depend on the axial dimension of the reels. In fact, the reels may be shaped like a disc, with an axial dimension substantially smaller than the diameter dimension, or they may be longer, with an axial dimension similar to the diameter dimension.

The gripping and handling device or member can also have further shapes or embodiments, such as pins provided with expandable elements.

The handling robot can be equipped with a second gripping and handling member for simultaneously gripping the reels on the outer surface used for handling the reels made of soft materials or in general products that, taken exclusively from the center and oriented with their axis vertical, can generate telescopic effects damaging the reels. The system consists of two or more elements or jaws, which move radially relative to the axis of the reels and contact the outer cylindrical surface of the reel. These elements are preferably coated with materials having high coefficient of friction, which results in high tangential forces with small radial forces. The radial movement is performed through pneumatic, hydraulic, electrical or mechanical elements with systems for controlling the radial force.

Further devices may be provided on the head of the second robot, for example tools equipped with suction cups connected to a suction system, for taking discs or sheets of various shapes and materials (paper, cardboard, corrugated cardboard, plastics), usually provided either at the base and at the top of the stacks of reels with vertical axis, or even between a reels and the following one, before the reels are sent to packaging and palletizing.

The various tools provided on the head of the second robot are connected to pressure management systems for generating vacuum or pressurized gas used during the steps of gripping, handling and releasing the reels or of gripping, handling and releasing the discs or sheets.

For labeling and handling the reels, it is also possible to take the reels from one or more supports, preferably parallel to one another and within the range of the two robots, i.e. the labeling robot and the gripping and handling robot.

The labeled reels can be stacked on one or more tables (static or equipped with roller conveyors, conveyor belts, moving platens) arranged within the range of the handling robot.

The handling robot can form stacks of reels with vertical axis arranged on several tables according to specific recipes defined by the user.

The plant described herein is suitably provided with a system of electrical, pneumatic, hydraulic and electronic components managed by a specific software, which handles all the equipment provided in the labeling and handling area. The software manages the individual actions of the label dispensing systems, the labeling robot, the pickup tables, the pressure management systems, the handling robot and the tools mounted thereon, the stacking tables, the outer labeler and the centering system.

The software manages the operations according to instructions received from the user, who can choose which and how many reels to label, how to label them, the labeling sequence, how many reels to take, where to deposit them, how to build stacks of vertical reels and whether to apply protective sheets at the base and above the stacks.

BRIEF DESCRIPTION OF THE DRAWING

The invention will be better understood by following the description below and the attached drawing, showing a non-limiting embodiment of the invention. More specifically, in the drawing.

DETAILED DESCRIPTION

Figure 2:
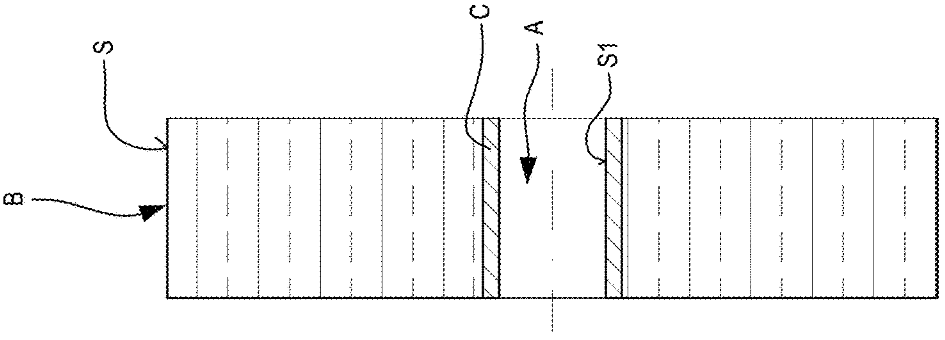
FIG. 2 is a cross-section according to II-II of FIG. 1.
Figure 1:
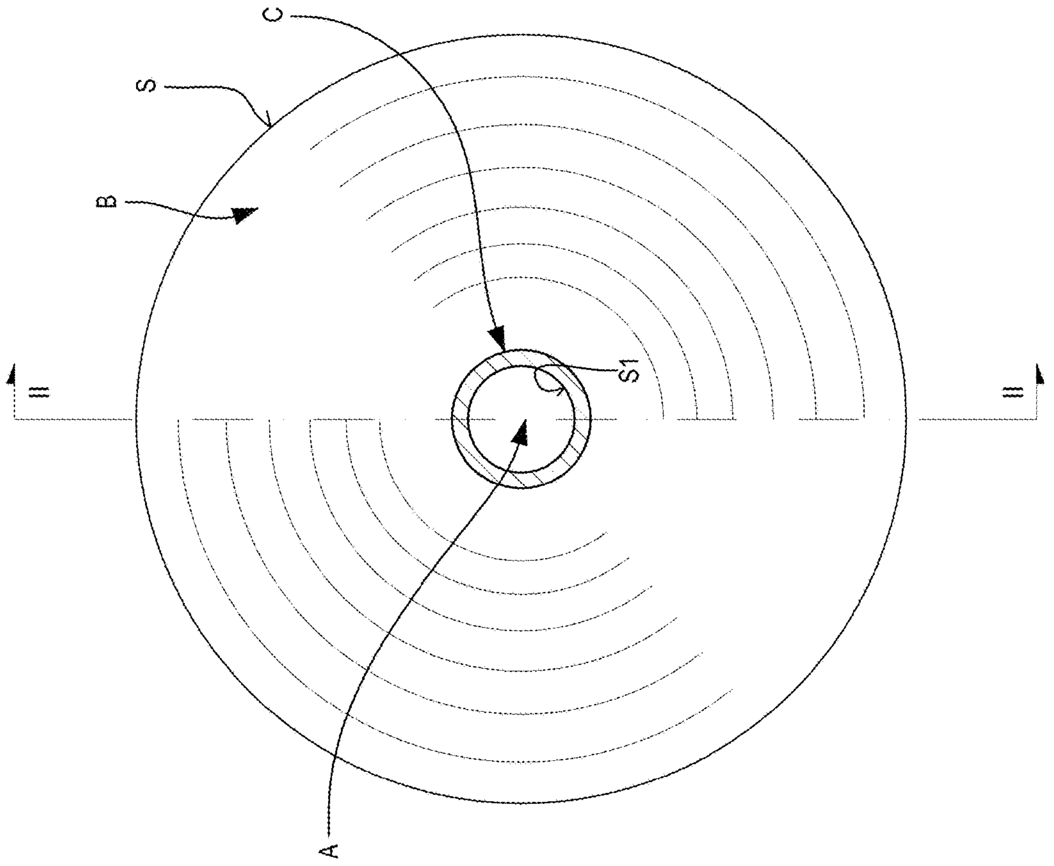
FIG. 1 shows a front view of a reel with a tubular winding core defining a central opening.
Figure 4:
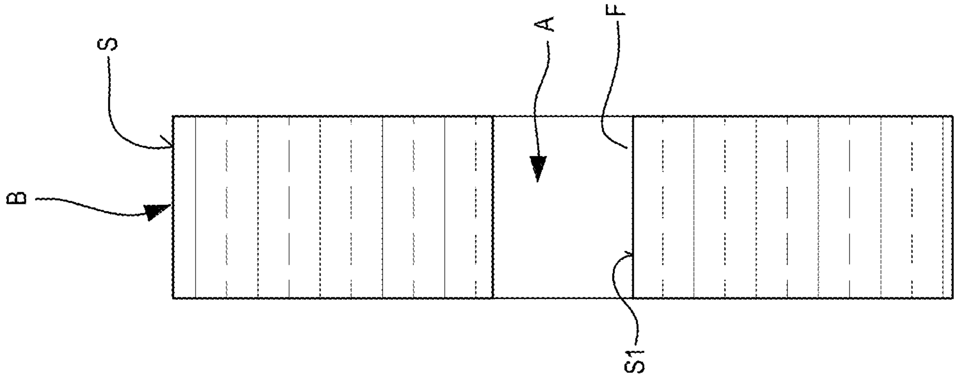
FIG. 4 shows a cross-section according to IV-IV of FIG. 3.
Figure 3:
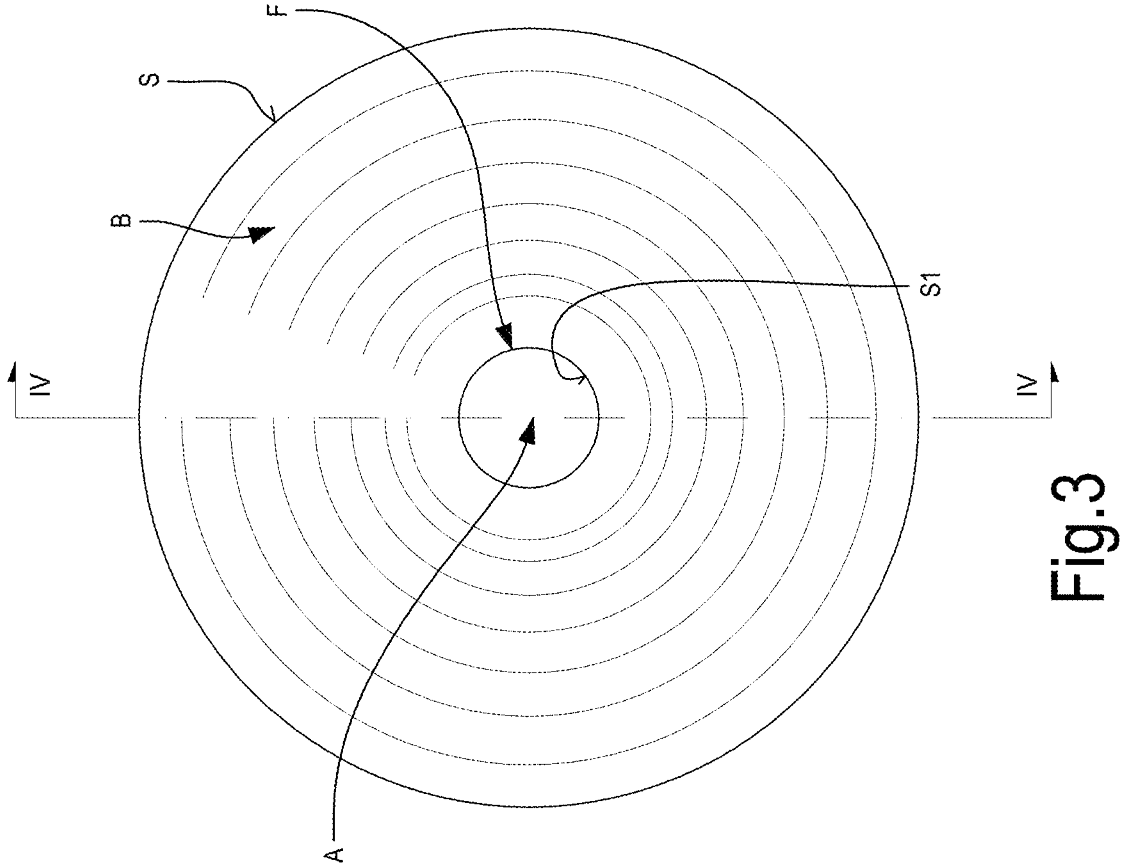
FIG. 3 is a front view of a reel with a central opening without the winding core.

FIGS. 1 to 4 show a generic reel B to be labeled and handled. The reels consist of web material that may be wound around a tubular element C, also referred to as winding core C, as shown in FIGS. 1 and 2. In other embodiments, the reels simply have a central hole F defining an empty cavity, as shown in FIGS. 3 and 4. In both cases, the reels B have a central opening A that is empty and coaxial with the turns of web material wound in a reel. S indicates the outer surface of the reel and S1 indicates the inner surface of the central opening A. The inner surface S1 may be defined either by the central winding core C or by the innermost turn of web material wound in a reel.

The reels B can have any diameter, but for many applications the reel diameter can be comprised between 300 mm and 2000 mm. The width, i.e. the axial dimension of the reels B, can also be variable; typically it can be comprised between 20 mm and 2000 mm but, in some cases, can be significantly greater.

The central opening, or central cavity, of the reels can have highly variable diameters, typically comprised, for example, between 50 mm and 400 mm.

It is understood that the values indicated above are purely indicative and the present invention can be applied to reels B of any diameter and width (axial dimension).

Figure 5:
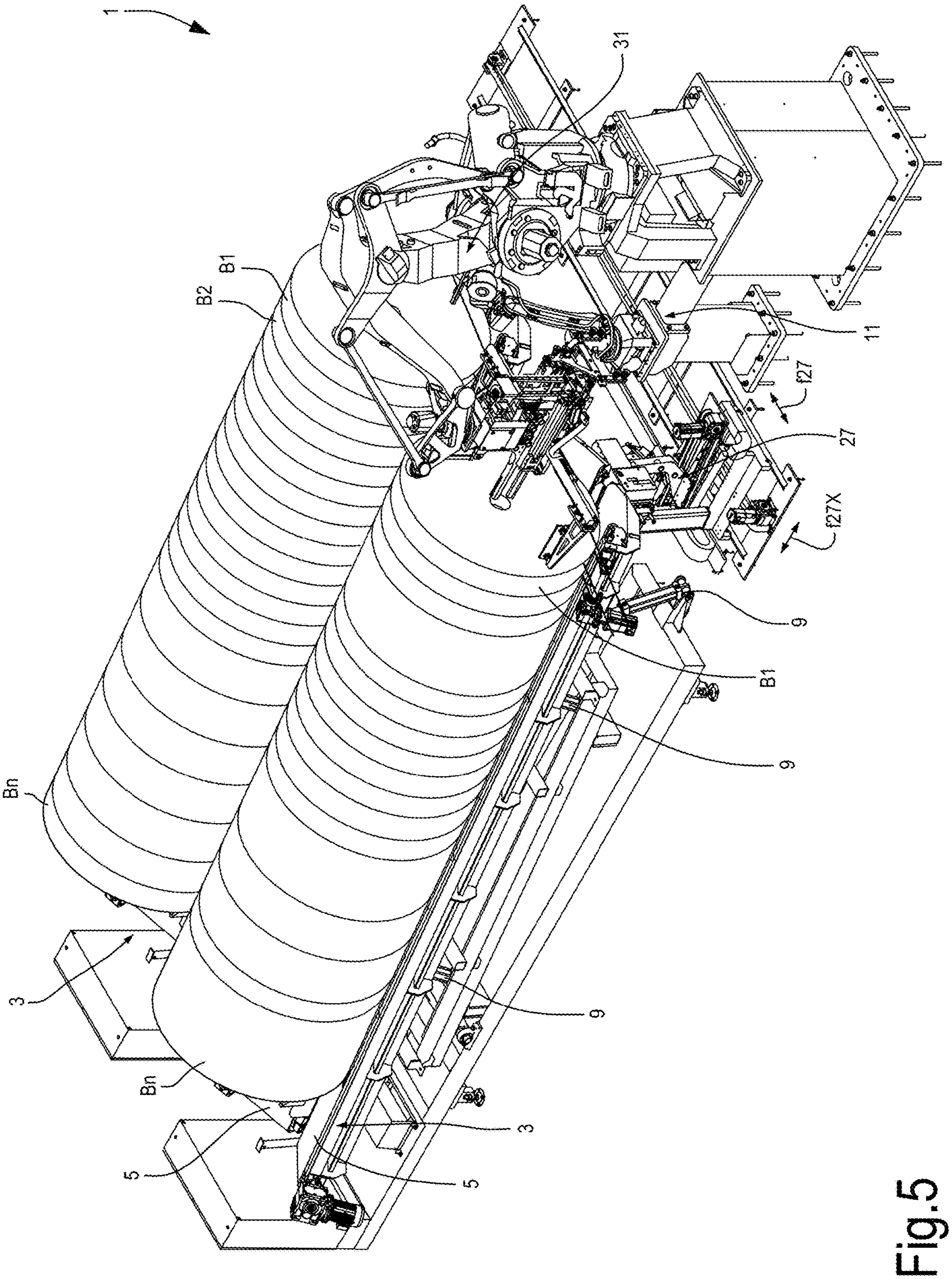
FIG. 5 is an axonometric view of a plant according to a first embodiment.
Figure 6:
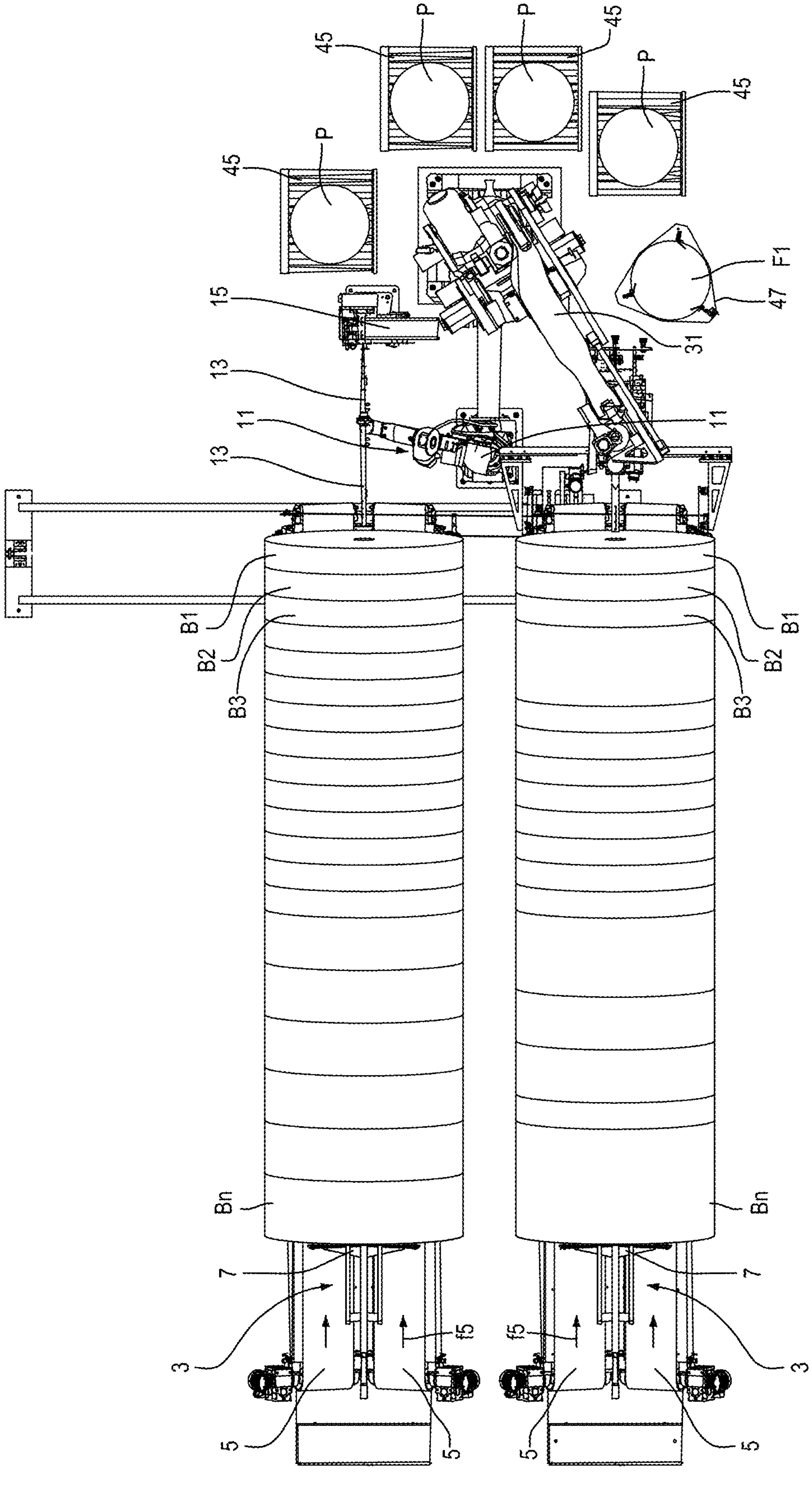
FIG. 6 is a plan view of the plant of FIG. 5.

FIGS. 5 and 6 show an axonometric view and a plan view of an embodiment of a system or plant 1 according to the invention for labeling and handling reels. The reels B1, B2, B3, . . . , Bn, usually coming from a machine equipped with a system for longitudinally cutting web materials (line cutting machines, rewinders, sheeters) are generally arranged with the axis in horizontal position and are loaded on tables or supports 3. In the illustrated embodiment, the plant 1 comprises two supports 3. This configuration has some advantages in terms of versatility and production speed, but it is also possible to provide a different number of supports 3, for example a single support 3 or more than two supports 3. In general, the supports should adequately be in such a number and position to be within the range of a pair of robots, described below.

The supports 3 may be directed in horizontal or inclined direction. In any case, they are arranged so that the reels B1-Bn rest on them with their respective cylindrical side surfaces. In this way, the flat surface of the end reel B1 of the series of reels B1-Bn resting on each single support 3 is free, to make the central openings of the reels accessible by the robots described below.

In the illustrated embodiment, each support forms V-shaped rest surfaces for supporting the reels B1-Bn.

The reels B1, B2, B3, . . . , Bn, loaded on the same support 3, can have widths (axial dimensions) and diameters different from one another, even if the diameters of the reels B1-Bn resting on a single support generally vary only slightly.

In some embodiments, as illustrated in the drawing, each table or support 3 comprises two conveyors 5 defining the V-shaped rest surface supporting the reels. The conveyors 5 can be belt conveyors, roller conveyors, chain conveyors, or other conveyors. They can be provided with a movement according to the arrow f5 (FIG. 6) to move forward the series of reels B1-Bn towards the handling and labeling area where the robots are arranged.

The supports 3 may be equipped with accessories 7 to keep the reels in position, for example in the form of pushers, which facilitate the movement of the reels according to the arrow f5.

The supports may be equipped with mechanisms 9 to adjust the inclination of the supports and to facilitate both the loading of the reels and the possibility of slightly inclining the axis of the reels relative to the horizontal so as to increase the stability during the labeling and pickup steps.

The labeling and handling plant 1 also comprises a first robot 11, hereinafter referred to as labeling robot 11, equipped with a specific device 13 for picking the labels up from a label dispenser 15 and for applying the labels to the inner surface S1 of the central opening A of the reels B.

Figure 7:
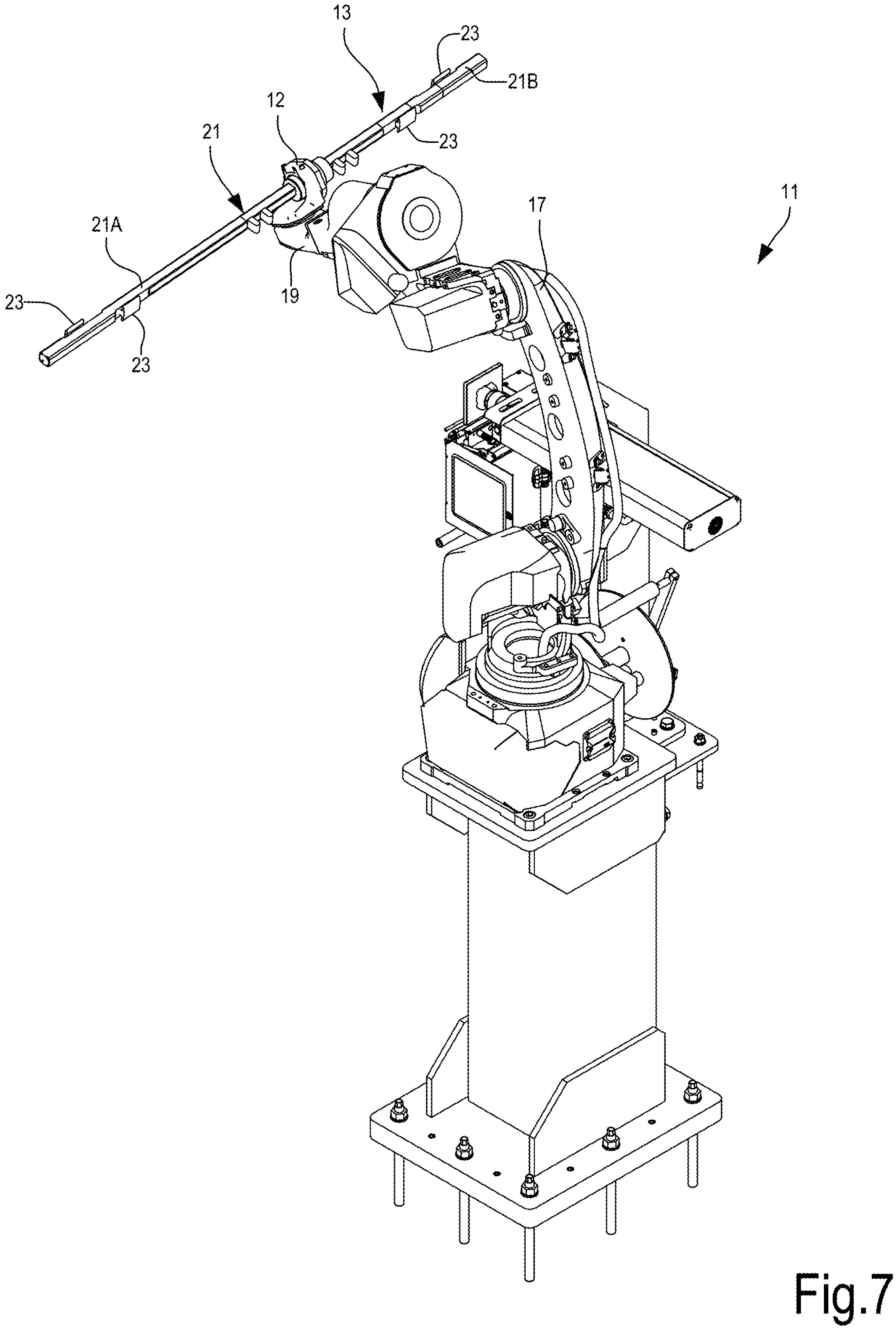
FIG. 7 shows an axonometric view of a first robot, or labeling robot, of the plant of FIGS. 5 and 6.

The first labeling robot 11 is represented in axonometric view in FIG. 7. It preferably has an anthropomorphic arm 17, ending in a head 19, to which the device 13 for picking up and applying the labels is fixed. In some embodiments, the device 13 advantageously comprises a rod-like element 21. The rod-like element 21 can be divided into two linear portions 21A and 21B, extending from an intermediate point, where the rod-like element 21 is connected to the head 19 of the anthropomorphic arm 17 of the first labeling robot 11.

In other embodiments, more than two linear portions may be provided, for example four linear portions arranged on a plane at 90° from one another and each provided with members for gripping the labels. In further embodiments, (three or more) linear portions are arranged in a three-dimensional rather than planar arrangement.

Each of the two linear portions 21A, 21B of the rod-like element 21 can have one or more gripping members 23 configured to grip single labels and to apply them inside the central opening A of the reels B. In the illustrated example, each linear portion 21A, 21B comprises two gripping members 23. As mentioned, the gripping members can be of the pneumatic type, and can have a suction pad, to which the non-glued surface of a label adheres by suction. The suction pad, once brought inside the central opening A of the reel B, is pressed on the inner surface S1 of the central opening A and, by stopping the suction and, if necessary, generating a flow of air or other fluid, it can be detached from the label gripping member and made adhere to the inner surface S1 of the central opening A of the reel.

Since each linear portion 21A, 21B has two label gripping members 23, a total of four inner labels can be attached on four reels B, two for each support 3, in every work cycle that will be described below.

In general, the label dispenser 15 can have any configuration; it can be adapted to dispense labels that have been already produced in a previous step, or can generate the labels, for example by printing them, or, when the label includes an RFID tag, it can store thereinside the requested information. Therefore, in some embodiments, the label dispenser 15 for the labels (that generally can consist of thin elements, which may have an adhesive surface) can comprise a printer generating the labels, a system for writing data in a RFID tag, a system for peeling off labels attached on a specific support and wound on reels, a system for dispensing labels one by one, or a combination thereof.

The gripping members 23 generally have a shape similar to the label to be handled, and can be made of different materials and have holes or grooves connected to the suction system through suitable pipes. The gripping members 23 can be generally arranged on springs or other elastic systems.

Once the gripping members 23 have taken the labels from the label dispenser 15, the labeling robot 11 moves the device 13 towards the axis of the reels to be labeled. Prior to, or simultaneously with, the movement of the device 13, a centering system 9 provides the labeling robot 11 with the position that the device 13 must take for the correct application of the labels. The centering system, i.e. the system for searching the center of the reels, is schematically indicated with 12 and can be provided on the head of the labeling robot 11.

The centering system can be constituted by a vision system, a scanner, various sensors, electromechanical or pneumatic devices, and can be installed on the labeling robot 11, or in a fixed position or on the support 3.

Knowing the position of the axis of the reels B1, B2, B3, . . . , Bn, the labeling robot 11 inserts either of the linear portions 21A, 21B of the rod-like element 21 inside the central openings A of the reels and applies the previously taken labels to the inner surface S1 of the central opening A of the reels.

In the illustrated example, each linear portion 21A, 21B has two gripping members 23 and therefore it is possible, for example, to apply two labels to two adjacent reels B1, B2 arranged on one of the two supports 3 by means of a linear portion 21A, 21B and to apply the other two labels to two reels B3, B4 adjacent to each other and arranged on the other of the two supports. In some cases, when the axial dimension of the reels is large, each linear portion 21A, 21B can apply only a single label to a single reel. It is also possible to apply more labels inside the same reel, if this is necessary due to the type of information to be associated with the reel.

The labels can be applied by moving the head of the labeling robot 11 in radial direction and making each label gripping member 23 press against the inner surface S1 of the respective reel B, B1, B2, B3, . . . , Bn. In this way, a contact pressure is generated, which allows the adhesive provided on the labels to make the label adhere to the inner surface S1. However, other methods can also be used for applying the labels, for example blows of air or other gas, electrostatic systems or other.

In addition to the label dispenser 15 and the labeling robot 11, the plant 1 can also comprise an outer labeling machine, able to apply labels to the outer surface S of the reels B, B1, . . . . Bn. In FIG. 5, the outer labeling machine is indicated with 27 and is provided under the end of the supports 3 closest to the labeling robot 11. The outer labeling machine 27 can be movable according to the double arrow f27 to apply labels to the reels supported by the two supports 3. The outer labeling machine 27 may be also provided with a movement according to the double arrow f27X, in a direction orthogonal to the direction of the double arrow f27, so as to translate under any one of several reels resting on the same support 3 and therefore to label two or more axially aligned reels. To this end, the outer labeling machine 27 can be mounted on a movable slide numerically controlled according to two orthogonal translation axes.

The outer labels can be applied by means of the outer labeling machine 27 in a time interval overlapping the time interval during which the inner labels are applied by means of the labeling robot 11.

Figure 8:
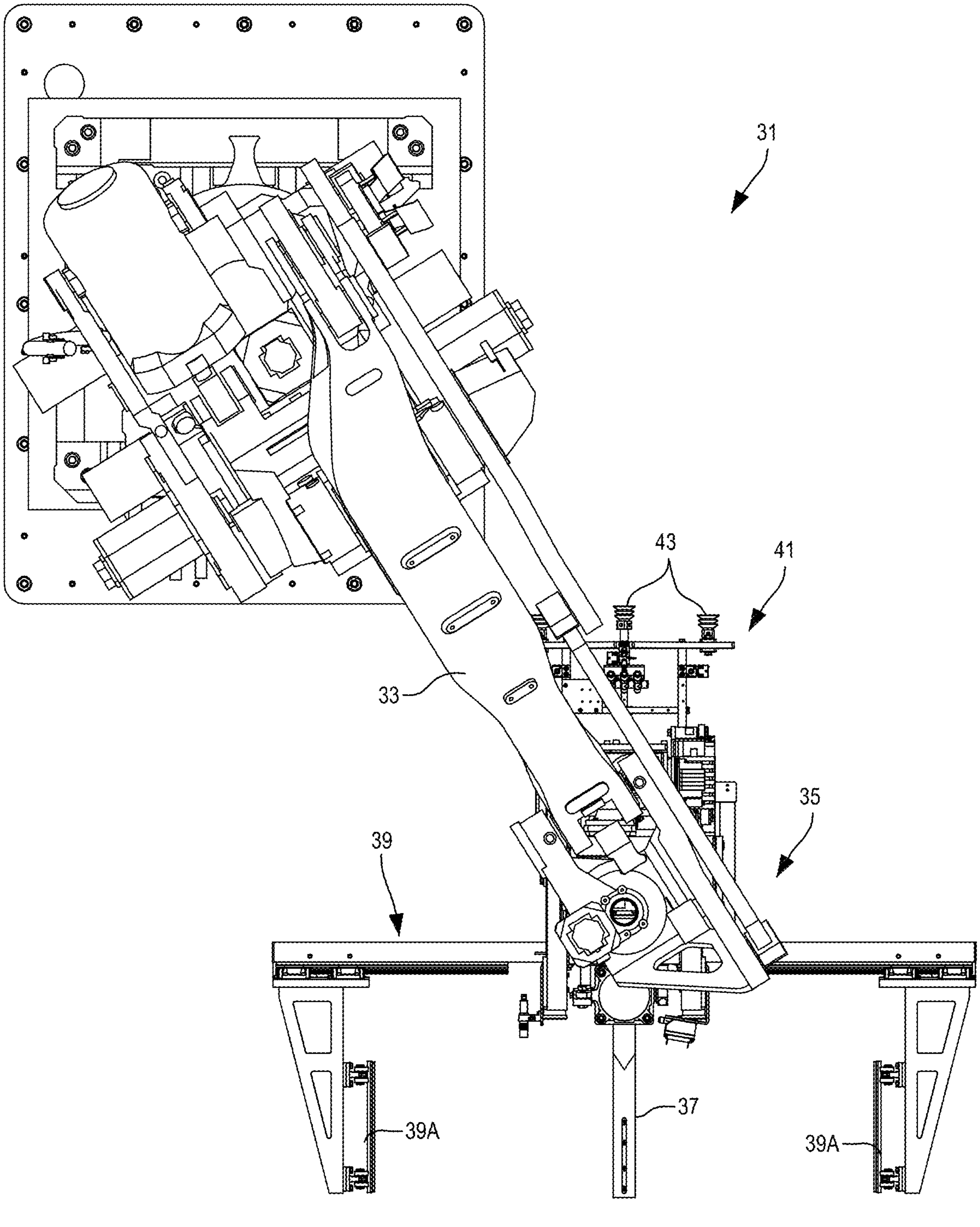
FIG. 8 is a plan view of a second robot, or handling robot, of the plant of FIGS. 5 and 6.
Figure 9:
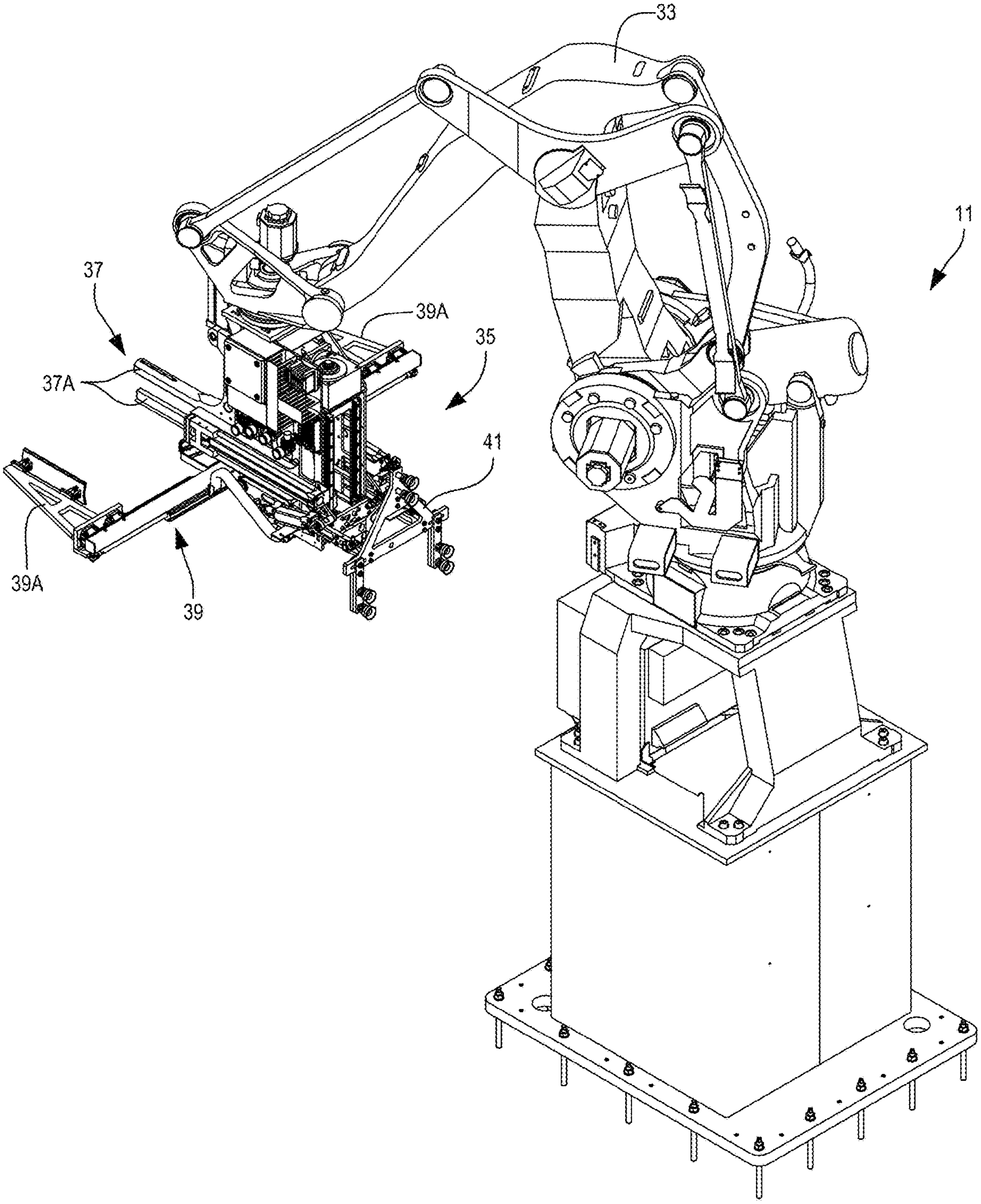
FIG. 9 is an axonometric view of the second robot of FIG. 8.

The plant 1 also comprises a second robot 31, hereinafter referred to as handling robot 31; a plan view thereof is shown in FIG. 8, an axonometric view thereof is shown in FIG. 9. In advantageous embodiments, the second robot or handling robot 31 comprises an anthropomorphic arm 33 with a head 35, on which members for gripping and handling the reels B, B1, B2 . . . . Bn are applied.

More specifically, a first member for gripping and handling the reels, indicated with 37, can be arranged on the head 35. The first gripping and handling member 37 is adapted to engage the reels from the center, i.e. by entering the central opening A of the reels. In the illustrated embodiment, the gripping and handling member 37 comprises two expandable portions 37A, which are provided with a radial movement away from each other so as to expand once the gripping and handling member 37 has been inserted into the central openings A of one or more axially aligned reels. The movement of the portions 37A of the gripping and handling member 37 away from and towards each other can be controlled by any suitable actuator, for example a pneumatic, hydraulic, electric, magnetic actuator or the like.

In the illustrated embodiment, the head 35 of the handling robot 31 comprises a second member 39 for gripping and handling the reels. The second gripping and handling member 39 comprises outer gripping members, adapted to engage the outer surface S of one or more reels B. In the illustrated embodiment, the second gripping and handling member 39 comprises two jaws 39A provided with a radial movement to engage and release the outer surfaces S of the reels B, B1, . . . . Bn. The gripping and handling members 37 and 39 can be used alternatively or in combination, for example depending upon the type of web material of which the reels B, B1, . . . , Bn are made and/or on the winding conditions, for example the compactness of the reels.

The gripping members are adapted to simultaneously engage a number of reels equal to or lower than those labeled by the labeling robot 11 in every working cycle.

In some embodiments, the head 35 of the handling robot 31 can comprise a sheet handler 41 for handling separating sheets or cover sheets, which may be arranged above and below a stack of reels put vertically over one another as illustrated below. The sheet handler 41 can comprise suction cups 43 adapted to engage the sheets by suction.

The plant 1 may also comprise one or more support surfaces 45, for example in the form of roller conveyors, conveyors, pallets or other, on which stacks P can be formed, comprised of reels B arranged vertically over one another with their axes in a vertical position, by means of the handling robot 31, through operations described below. Each of the support surfaces 45 can also consist of, or integrate, a conveyor (not shown), for example a roller conveyor, a belt conveyor or the like, to move the stacks P of reels away from the plant 1. Under the reel in the lowest position and/or above the reel in the highest position of each stack P, a preferably circular sheet F can be arranged, taken by the handler 41 of the handling robot 31 from a sheet storage 47. If necessary, sheets F1 can also be interleaved between reels.

A single stack or a plurality of stacks of reels can be formed on each support surface.

The operating cycle of the plant 1 described above is illustrated in detail in the sequence of FIGS. 10 to 22, showing different views of various operational steps. For greater clarity, in FIGS. 10 to 22 some parts of the plant 1 have been omitted. In particular, in these figures only one table or support 3 is shown, and the outer labeler 27 has been omitted. In some figures, the roller conveyors 45 are also omitted.

Figure 10:
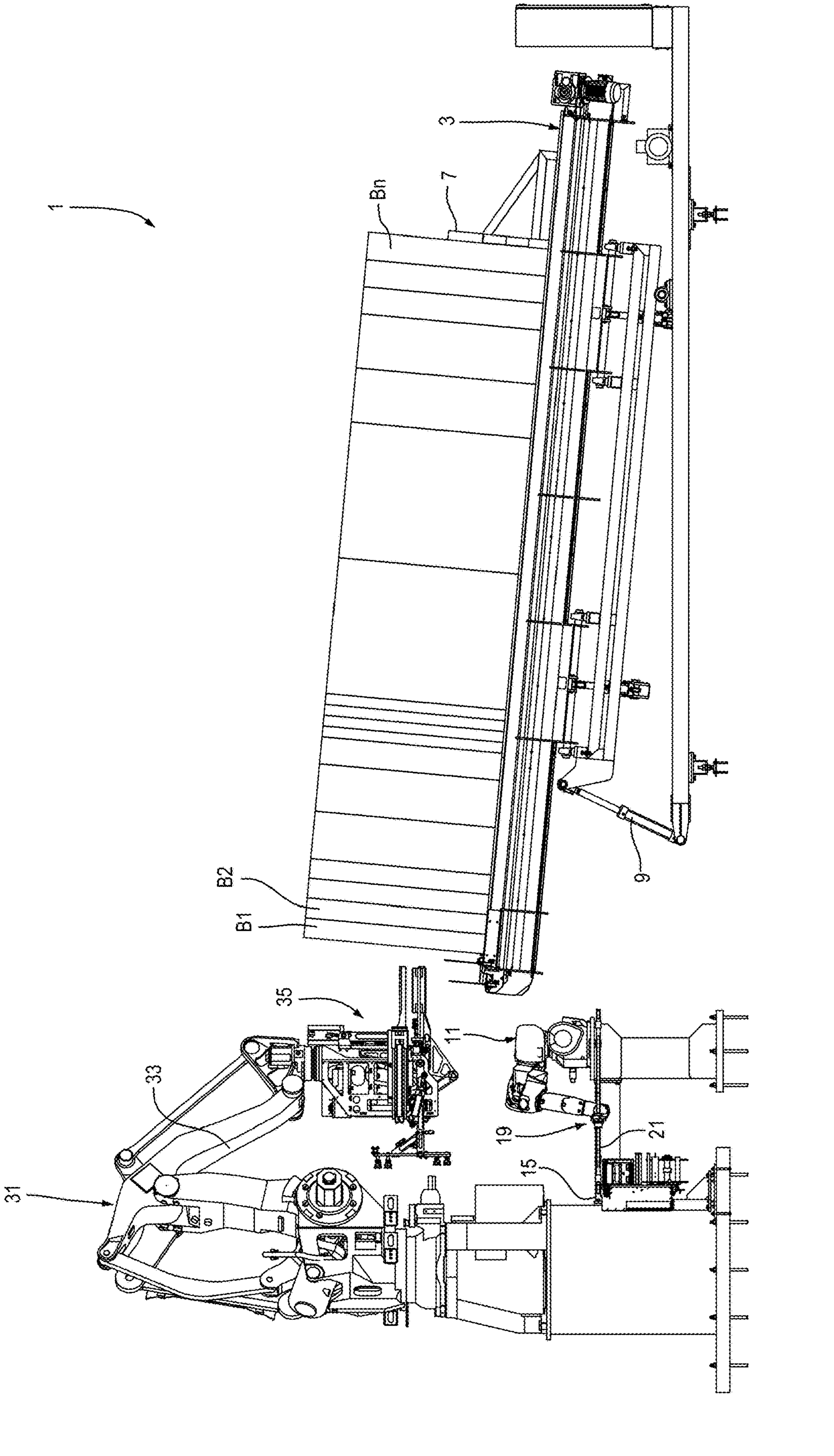
FIGS. 10, 11 and 12 are simplified views of the plant, with some parts omitted, and more precisely a side view, a plan view and an axonometric view, in a step where the first robot picks the labels up from a labeling machine.
Figure 11:
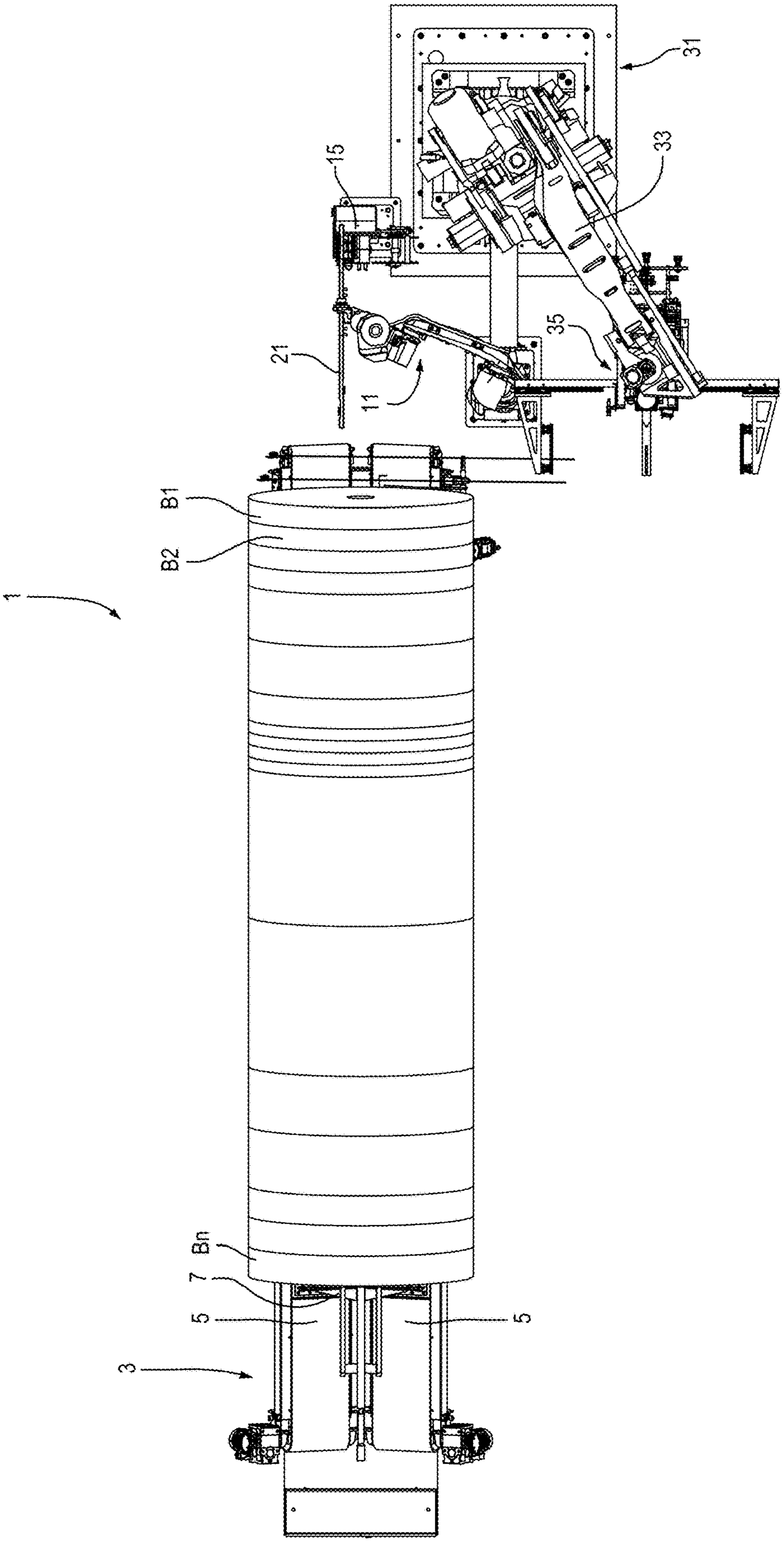
Figure 12:
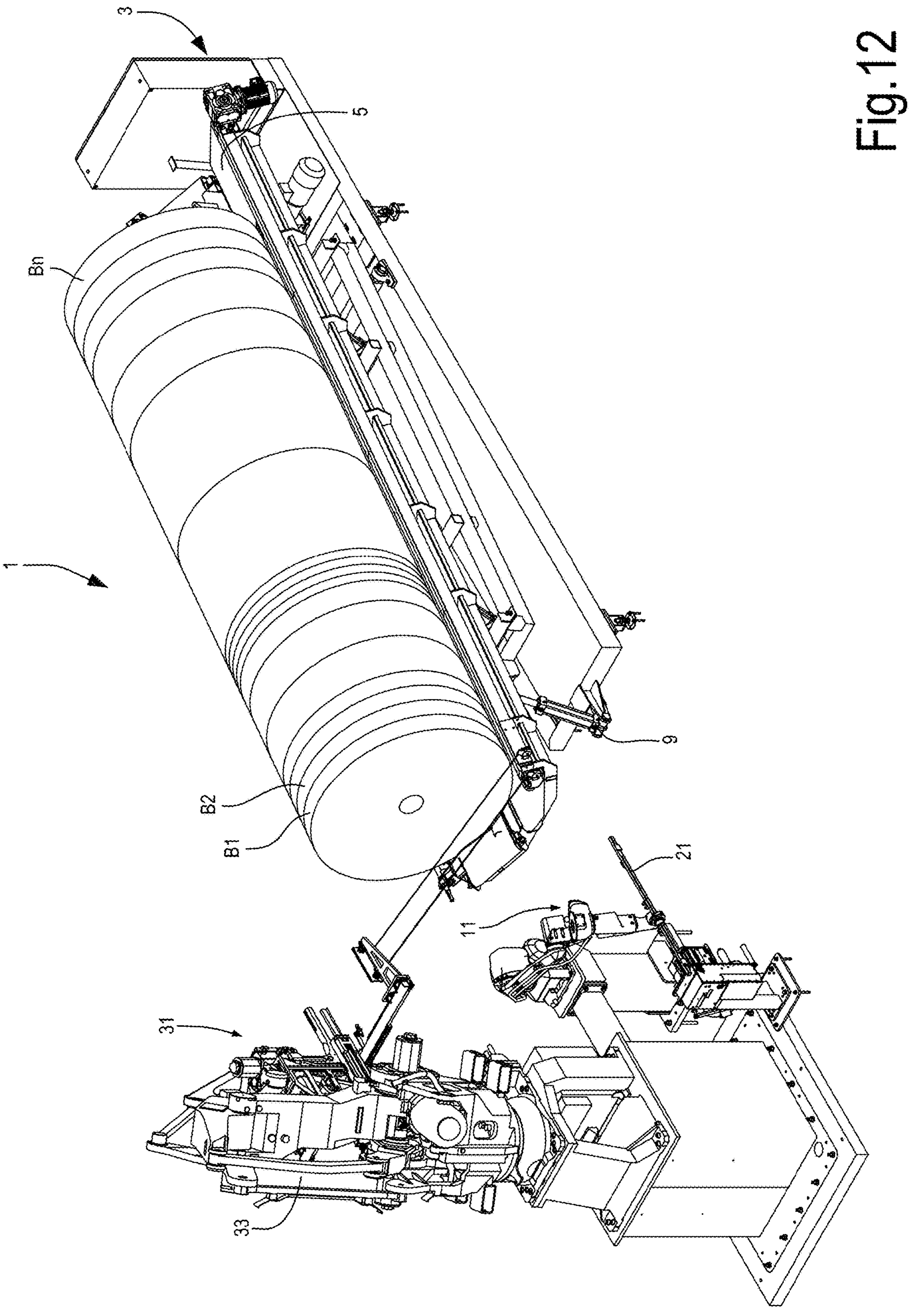
Figure 13:
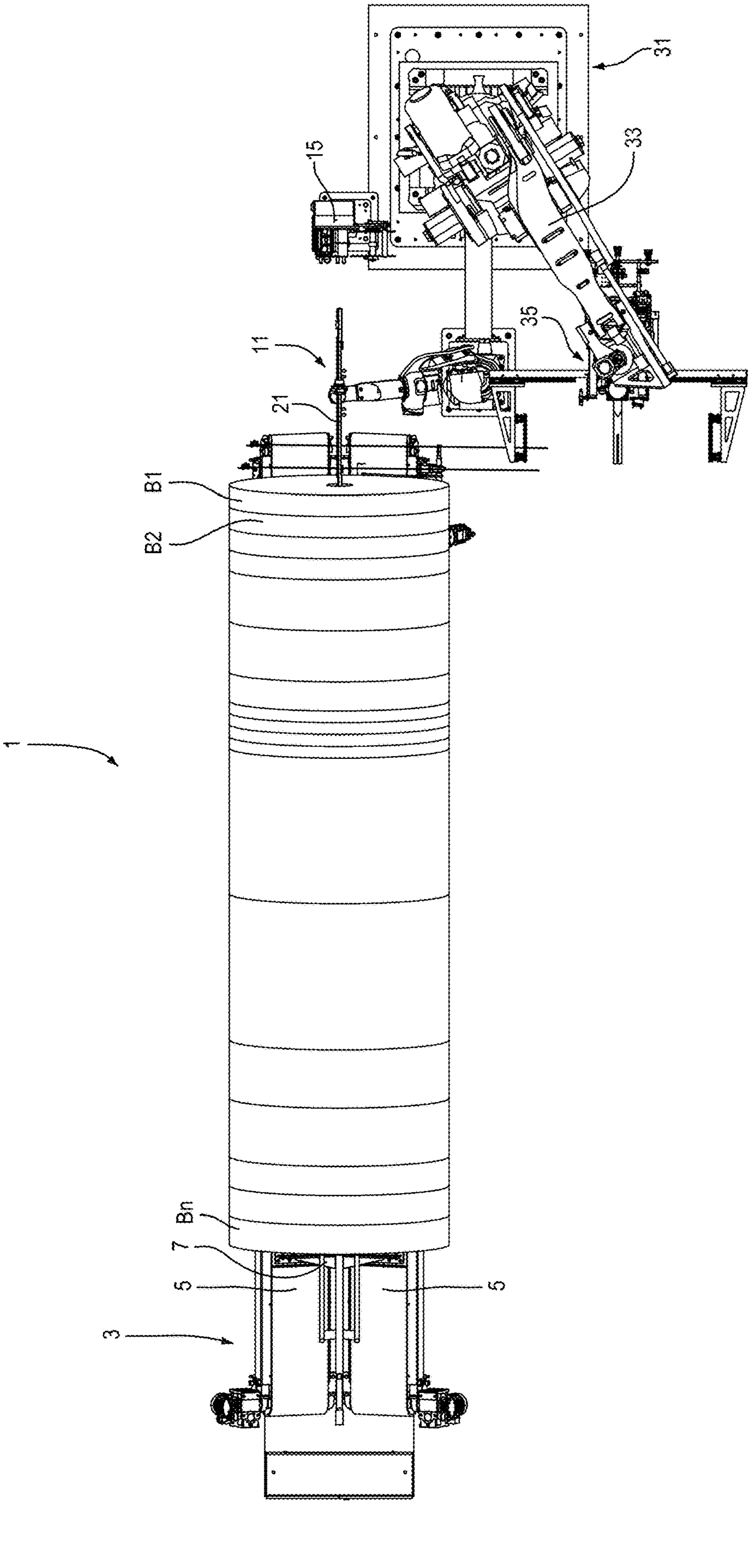
FIGS. 13 and 14 are simplified plan and front views in a centering step of the labeling robot.
Figure 14:
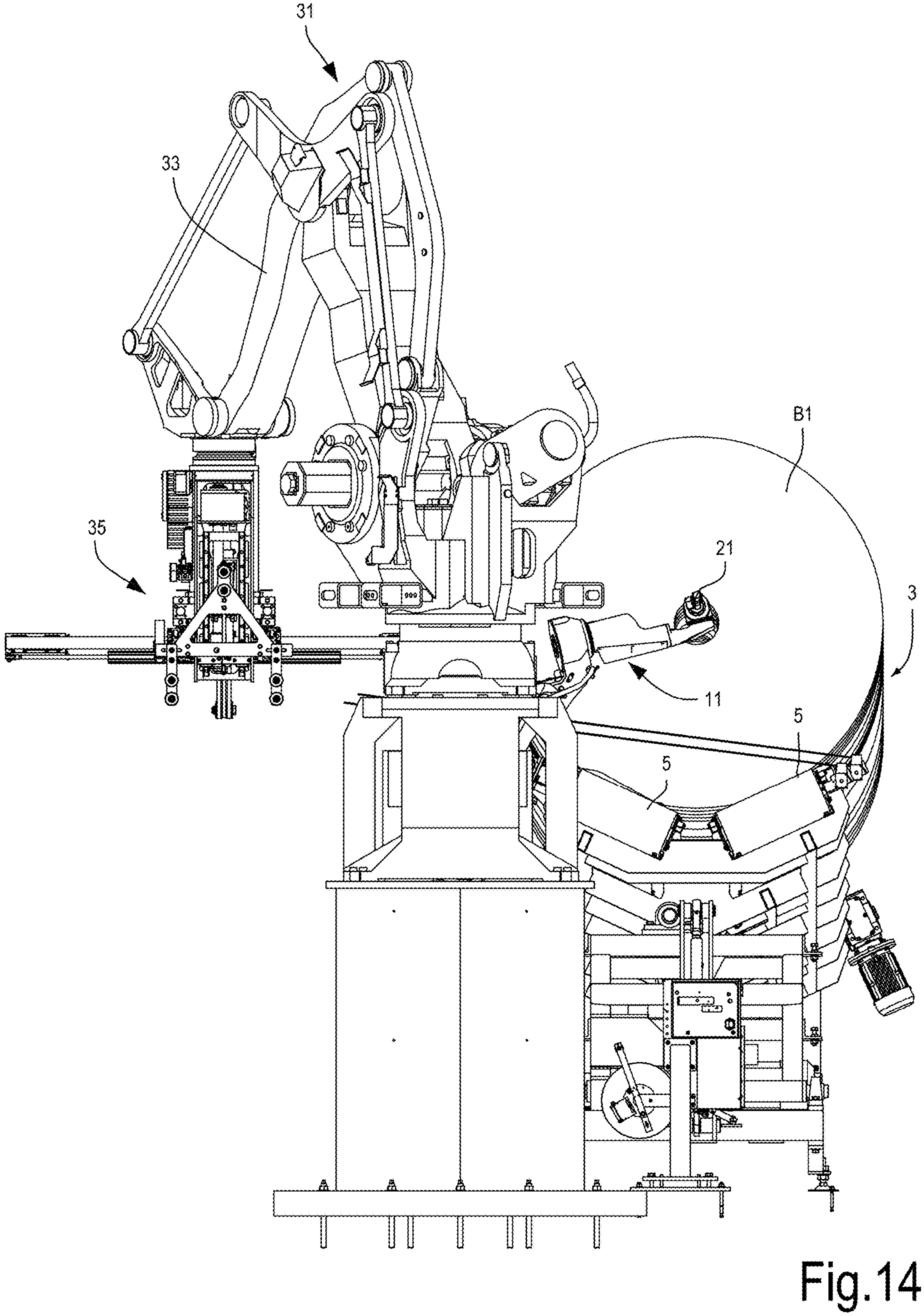

The operational cycle is as follows. FIGS. 10, 11 and 12 show respectively a side view, a plan view and an axonometric view of the pickup step wherein the labeling robot 11 takes the labels from the label dispenser 15. FIGS. 13 and 14 show respectively a plan view and a front view of the centering step, i.e. the step of searching the center of the reels B to insert the rod-like element 21 into the axial opening of the reels.

Figure 15:
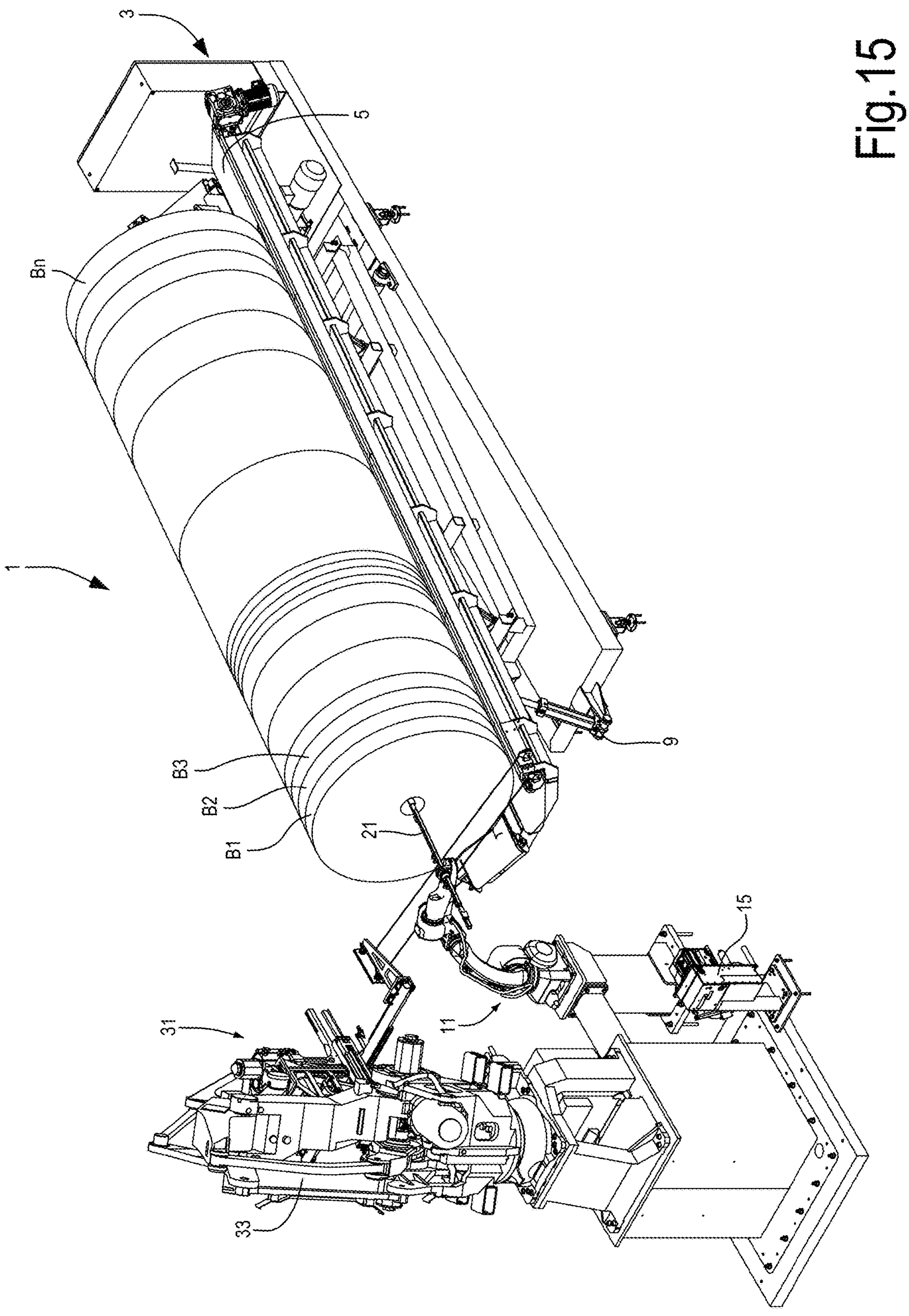
FIGS. 15 and 16 are an axonometric view and a plan view of the step of inserting the labels into the reels.

FIG. 15 shows an axonometric view of the step wherein the rod-like element 21 of the labeling robot 11 is inserted into the central opening A of the two reels closest to the robot 11.

Figure 16:
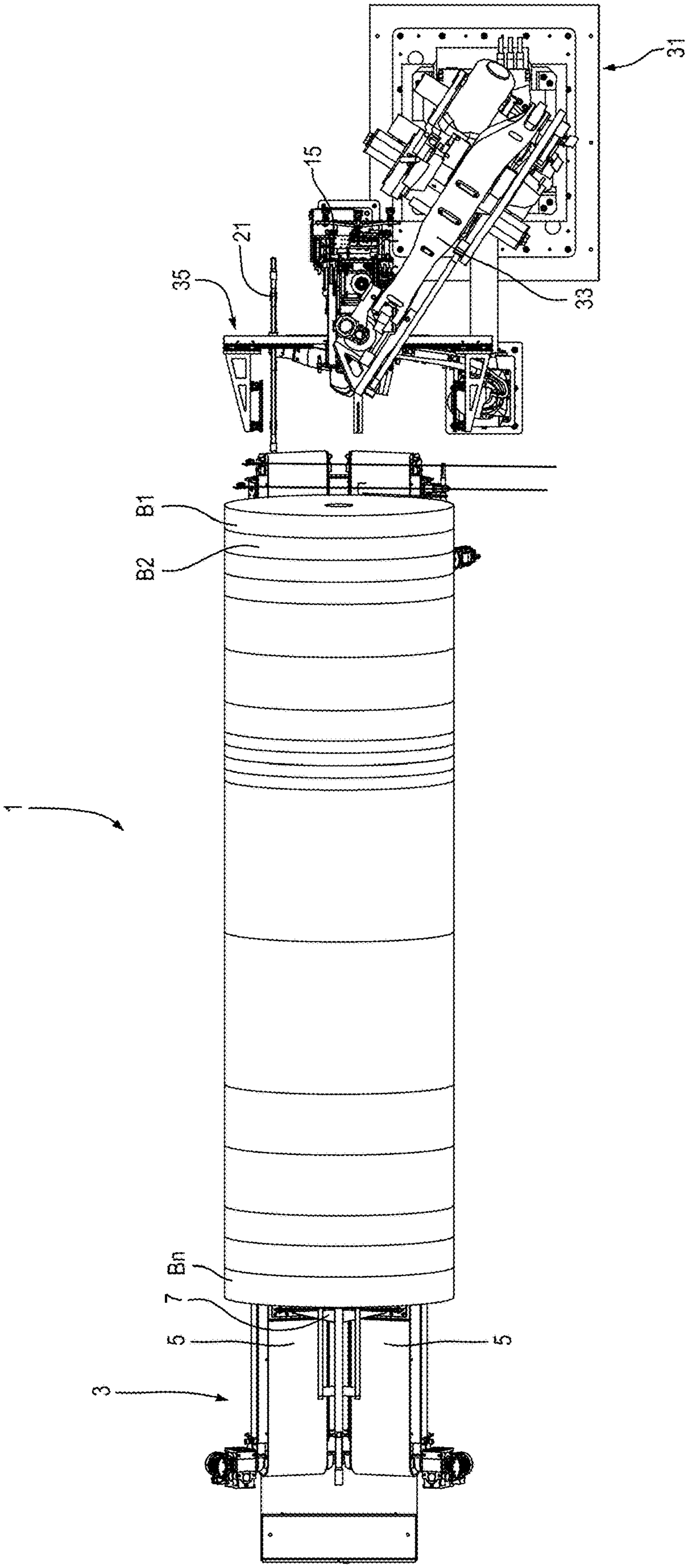
Figure 17:
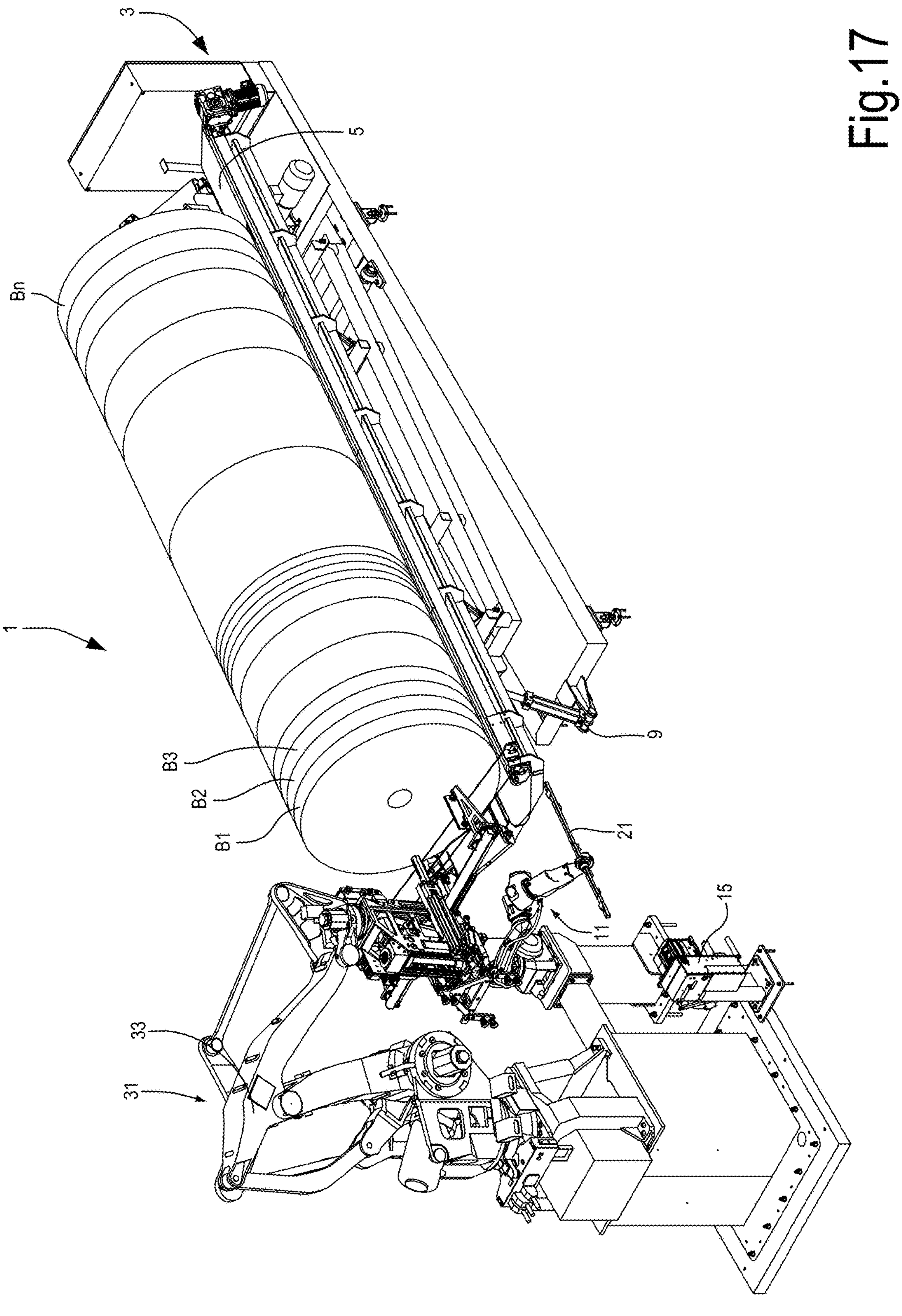
FIG. 17 is an axonometric view of the centering step of the second robot, or handling robot.

FIGS. 16 and 17 show respectively a plan view and an axonometric view of the centering step wherein the handling robot 31 searches the center of the reel. The center of the reel can be identified using a single centering system, the detection whereof is used by both robots 11 and 31. After the labeling robot 11 has applied one or more labels to one or more reels, the labeling robot 11 can be moved away from the reels and can perform a new step of taking the labels from the label dispenser 15.

Figure 18:
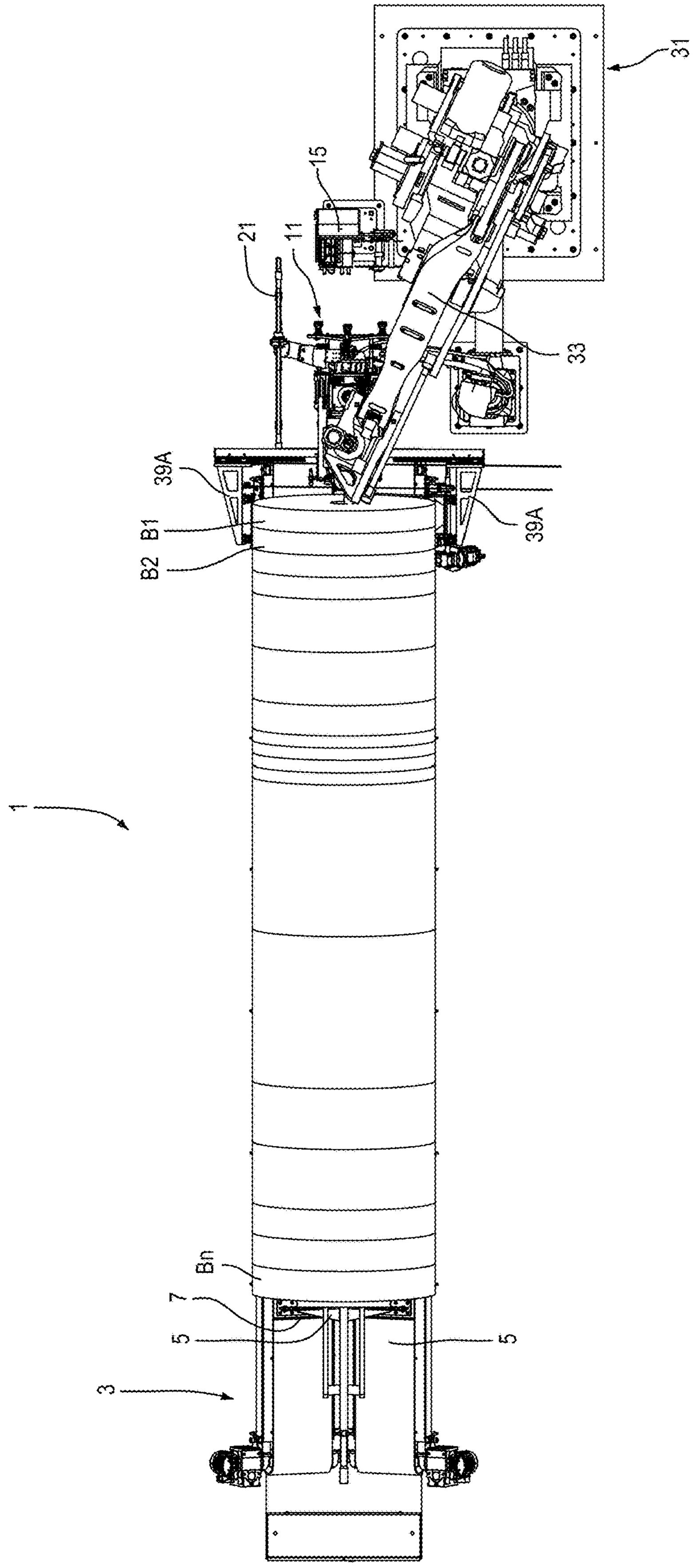
FIGS. 18 and 19 are a plan view and an axonometric view of the step of gripping the reel by the second robot.
Figure 19:
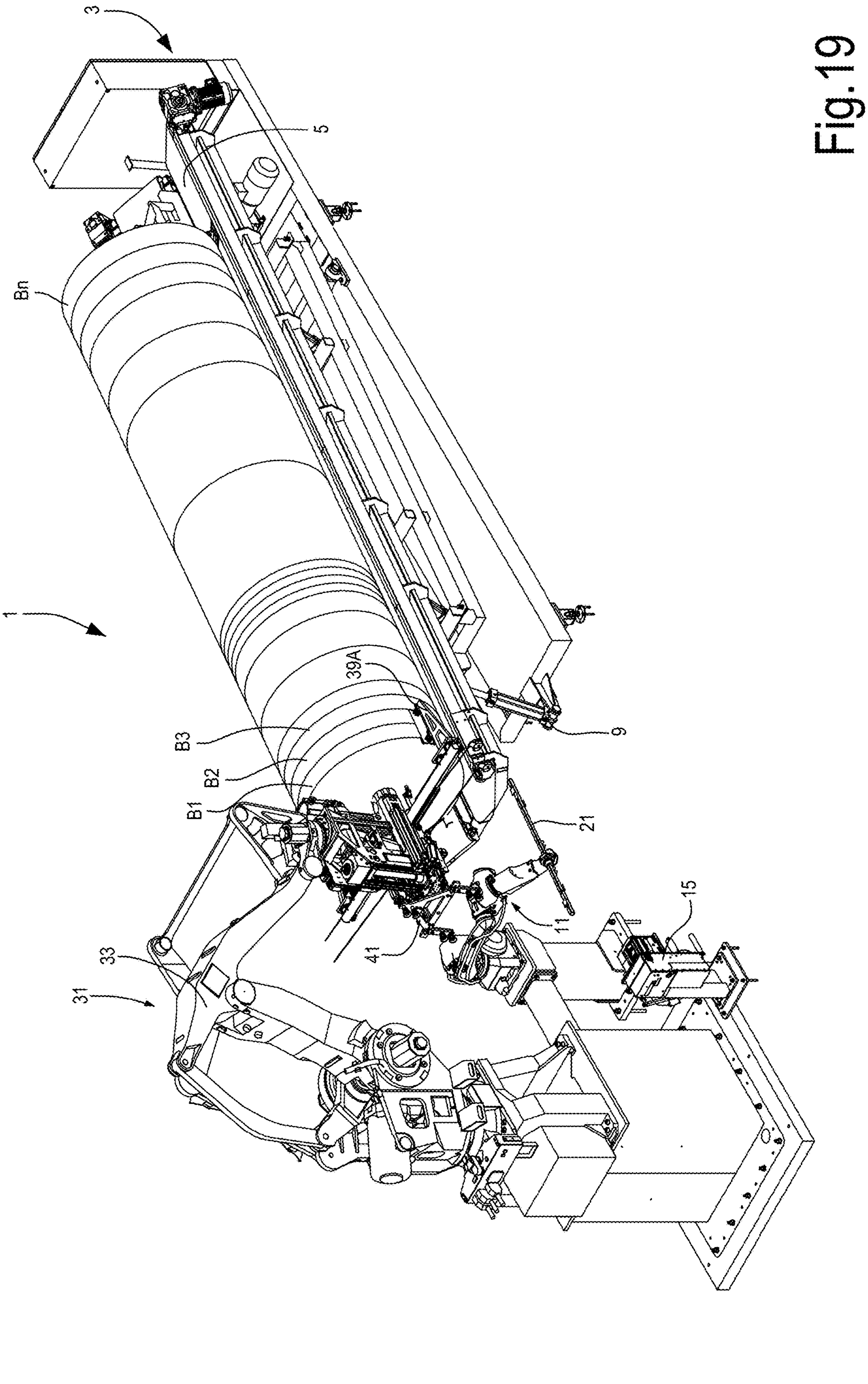

FIGS. 18 and 19 show respectively a plan view and an axonometric view of the gripping step wherein the gripping and handling members of the handling robot 31 grip two reels.

Figure 20:
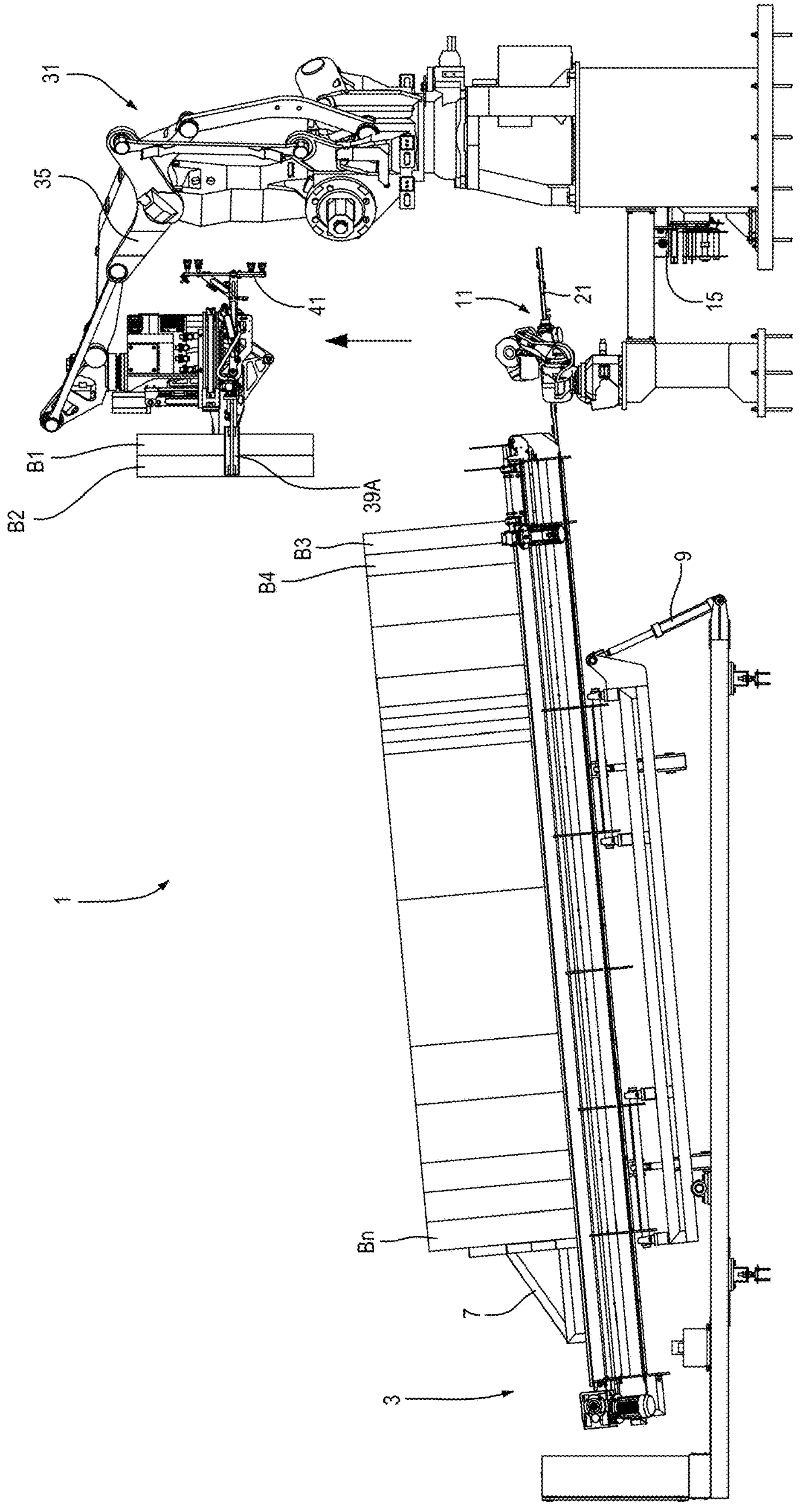
FIGS. 20 and 21 are a side view and an axonometric view of the step of simultaneously lifting two reels by the second robot.
Figure 21:
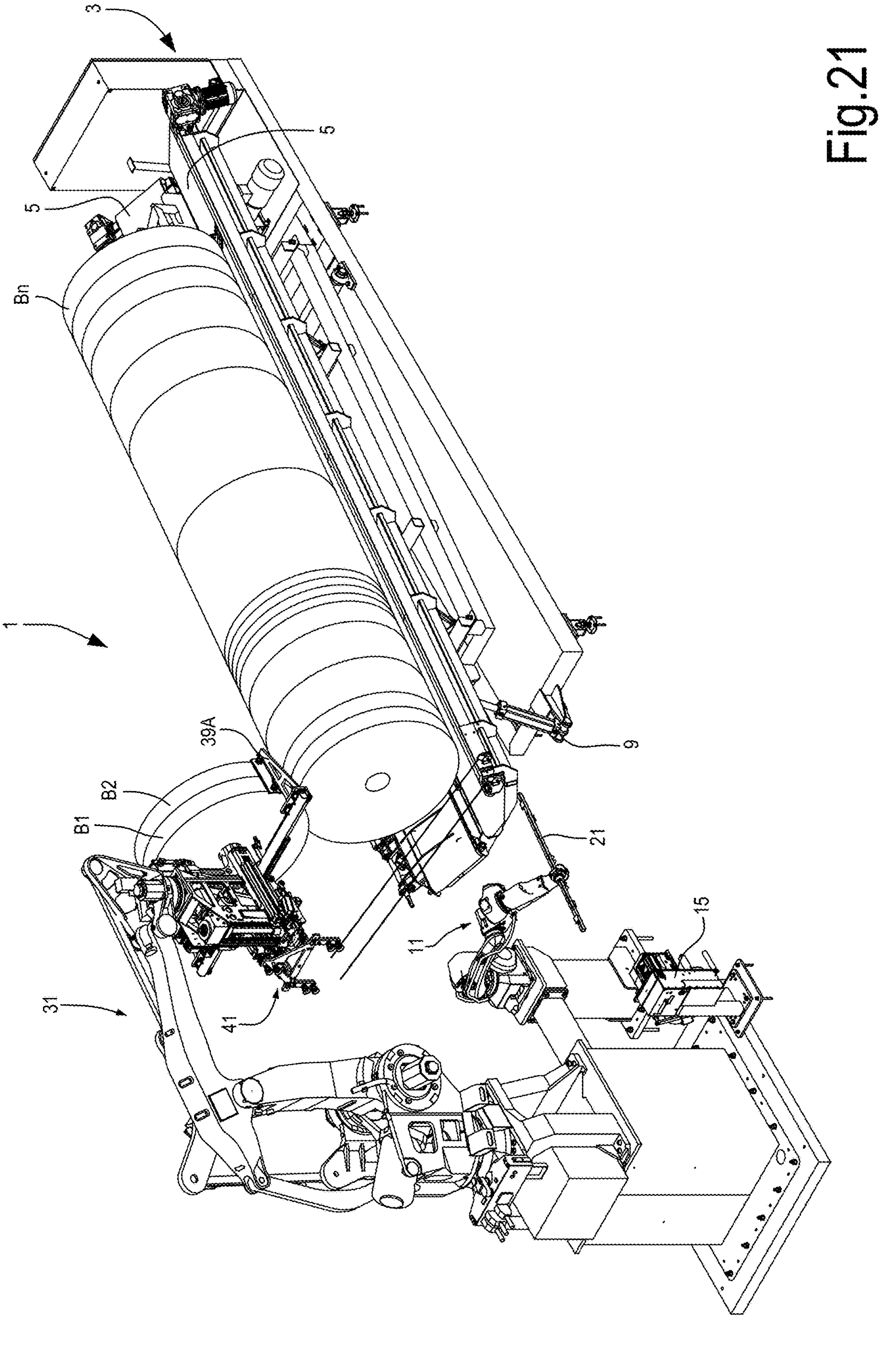

FIGS. 20 and 21 show the lifting step wherein the handling robot 31 raises the two reels.

Figure 22:
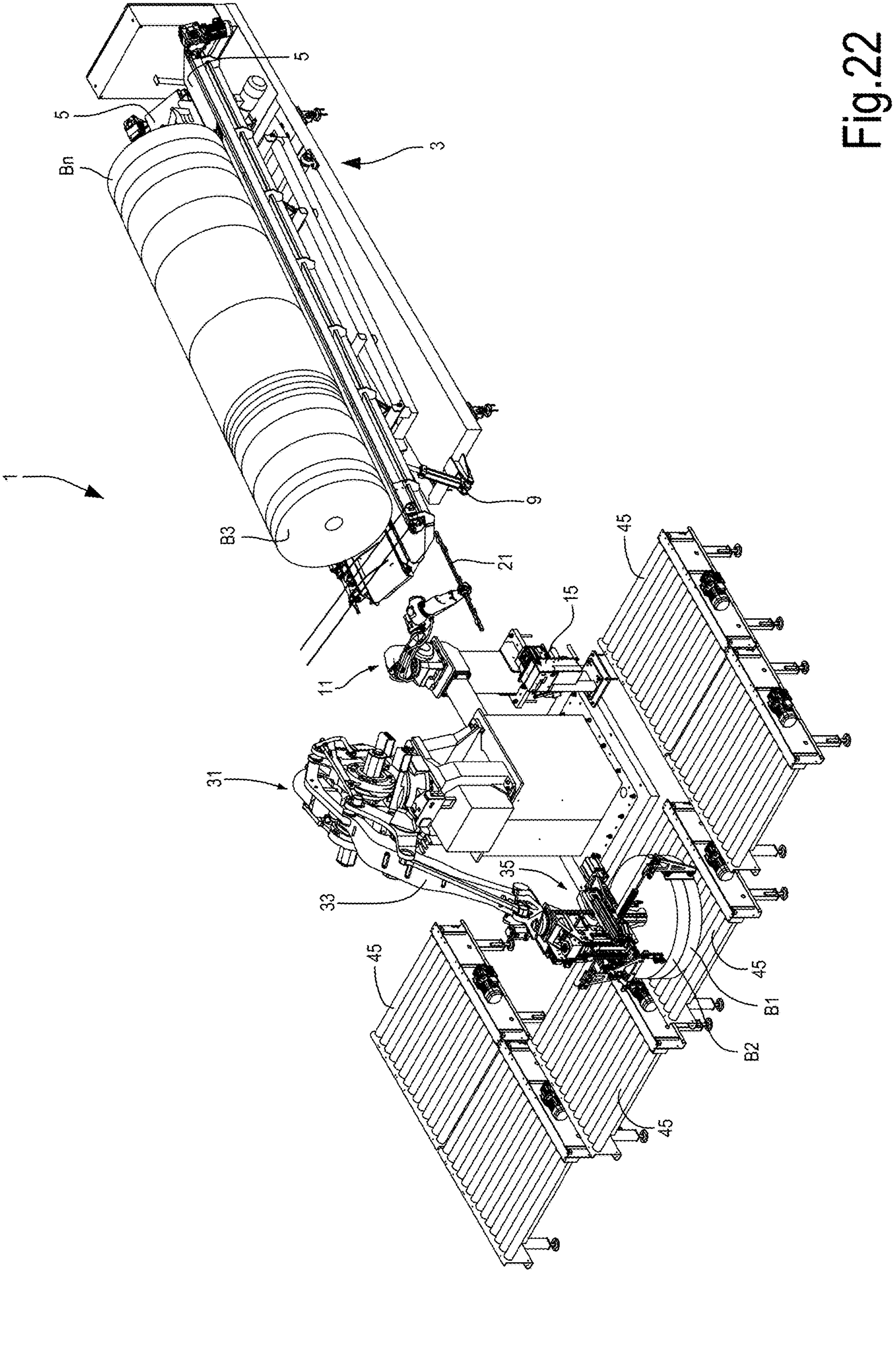
FIG. 22 is an axonometric view of the depositing step where the reels are deposited by the handling robot on a roller conveyor, with their axes in vertical position.

Once the reels have been lifted, the head of the handling robot turns them, arranging them with the respective axis vertical, and places them on one or the other of the roller conveyors or other support surfaces 45, as shown in FIG. 22.

The operations described above can be repeated for all the reels of both the two supports or tables 3, to form one or more stacks of identical or different reels on one or more roller conveyors 45.

In some embodiments of the labeling and handling method which can be implemented through the plant 1, it is possible to label and remove all the reels of one of the two supports 3 and then all the reels of the other of the two supports 3. In this case, when a first support 3 has been emptied, the robots 11 and 31 can process the reels of the second support 3, while a new series of reels to be labeled is loaded onto the first support. In other embodiments of the method, the reels can be labeled and taken from one and the other of the two supports 3, for example to group the reels in homogeneous vertical stacks (for example reels with the same axial dimension), taking reels collected in non-homogeneous fashion on the two tables 3.

The invention claimed is:

1. A plant for labeling and handling reels of web material, the reels having a central opening, around which the web material is wound, the plant comprising:
- at least a support for the reels to be labeled;
- a label dispenser;
- a first labeling robot adapted to take labels from the label dispenser and to insert the labels into the central openings of the reels arranged on the support; and
- a second handling robot adapted to take the reels and to move the reels away from the support.

2. The plant of claim 1, wherein the first robot includes a label pickup device comprising at least one rod element provided with a plurality of label pickup members configured to engage the labels and to release the labels on an inner surface of the central opening of the reels.

3. The plant of claim 2, wherein the rod element is connected to the robot at an intermediate point and comprises two linear portions extending from the intermediate point, each linear portion having at least one label pickup member.

4. The plant of claim 1, wherein the second robot comprises a first reel gripping and handling member, configured to engage the reels from the inside of the central opening.

5. The plant of claim 4, wherein the first gripping and handling member is an expandable member.

6. The plant of claim 1, wherein the second robot comprises a second reel gripping and handling member for gripping and handling the reels, configured to engage the reels on an outer surface of the reels.

7. The plant of claim 6, wherein the second gripping and handling member comprises a pair of jaws provided with a reciprocal movement towards, and away, from each other to radially grip the reels from the outside.

8. The plant of claim 1, wherein the support for the reels to be labeled is configured to support the reels resting with respective side surfaces of the reels on the support.

9. The plant of claim 1, wherein the label dispenser comprises a label printing device.

10. The plant of claim 1, wherein the first robot comprises a first anthropomorphic arm.

11. The plant of claim 1, wherein the second robot is configured to modify the orientation of the reels and to arrange the reels with a respective axis of the reels in an approximately vertical position.

12. The plant of claim 1, wherein the second robot comprises a second anthropomorphic arm.

13. The plant of claim 1, wherein at least one system for searching the reel center is associated with the first robot and the second robot.

14. The plant of claim 1, wherein the second robot comprises a handler for gripping and handling separating sheets intended to be interposed between stacked reels and/or to cover end faces of a stack of reels.

15. The plant of claim 1, comprising an outer labeler adapted to label the reels on an outer surface of the reels.

16. The plant of claim 1, wherein the support comprises a V-shaped rest surface for a series of aligned reels.

17. The plant of claim 1, wherein the support comprises a conveyor to move the reels towards the first robot and the second robot.

18. The plant of claim 1, wherein the support is configured to arrange the reels with a reel axis inclined with respect to the horizontal, so that the reel closest to the first robot and to the second robot is arranged at greater height than the reel farthest from the first robot and the second robot.

19. The plant of claim 1, comprising a further support for the reels, the first robot and the second robot being configured to act on reels resting on both supports.

20. A method for labeling and handling reels of wound web material having a central opening and a side outer surface, the method comprising the following steps:

arranging a plurality of reels on a reel support;

through a first robot, applying a label inside each reel in the reel central opening; and through a second robot, taking each labeled reel from the support and moving the labeled reel therefrom.

21. The method of claim 20, wherein the step of taking and moving each reel comprises the step of overturning the reel and arranging the reel with the respective axis in a vertical position, and the step of stacking a plurality of reels coaxially with one another.

22. The method of claim 20, wherein during the step of taking and moving the reel, the first robot carries out a step of picking up one or more labels to be applied to subsequent reels arranged on the support.

23. The method of claim 20, further comprising the step of applying a label to the outer surfaces of the reels, while the reels are arranged on the support.

* * * * *